(12) United States Patent
Heard

(10) Patent No.: US 9,669,802 B2
(45) Date of Patent: Jun. 6, 2017

(54) WIPER ASSEMBLY, A WINDSHIELD WIPER APPARATUS AND A METHOD OF REUSING THE WIPER ASSEMBLY

(71) Applicant: GM GLOBAL TECHNOLOGY OPERATIONS LLC, Detroit, MI (US)

(72) Inventor: Charles H. Heard, Farmington Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/874,677

(22) Filed: Oct. 5, 2015

(65) Prior Publication Data

US 2017/0096125 A1 Apr. 6, 2017

(51) Int. Cl.
*B60S 1/38* (2006.01)
*A47L 13/11* (2006.01)

(52) U.S. Cl.
CPC ............... *B60S 1/38* (2013.01); *A47L 13/11* (2013.01); *B60S 2001/3812* (2013.01); *B60S 2001/3836* (2013.01); *B60S 2001/3837* (2013.01); *B60S 2001/3841* (2013.01)

(58) Field of Classification Search
CPC ........ B60S 1/38; B60S 1/3848; B60S 1/3801; B60S 2001/3836; B60S 2001/3837; B60S 2001/3827; B60S 2001/3812; A47L 13/11
USPC .... 15/250.48, 250.361, 250.43, 250.44, 245, 15/245.1
See application file for complete search history.

(56) References Cited

U.S. PATENT DOCUMENTS

| | | | | |
|---|---|---|---|---|
| 1,706,053 A | * | 3/1929 | Bussinger | A47L 1/06 15/176.1 |
| 2,261,475 A | * | 11/1941 | Kautenberg | A47L 1/06 15/245 |
| 3,961,395 A | * | 6/1976 | Journee | B60S 1/38 15/250.48 |
| 4,094,037 A | * | 6/1978 | Karpp | A47L 1/06 15/245 |
| 4,296,522 A | * | 10/1981 | Brack | B60S 1/3801 15/245 |

(Continued)

FOREIGN PATENT DOCUMENTS

| | | | |
|---|---|---|---|
| DE | 2643360 | * | 3/1978 |
| DE | 3617780 | * | 10/1986 |

(Continued)

OTHER PUBLICATIONS

Machine translation of description portion of German publication 2643360, published Sep. 25, 1976.*

*Primary Examiner* — Gary Graham
(74) *Attorney, Agent, or Firm* — Quinn IP Law

(57) ABSTRACT

A wiper assembly includes a housing and a blade coupled to the housing. A windshield wiper apparatus includes a glass panel and the wiper assembly selectively movable relative to the glass panel. A method of reusing the wiper assembly includes the housing and the blade. The blade includes a first edge portion disposed along a first side of the blade and a second edge portion disposed along a second side of the blade. The first edge portion and the second edge portion are reversible relative to the housing such that one of the first and second edge portions is disposed in a use position and the other one of the first and second edge portions is disposed in a storage position.

12 Claims, 2 Drawing Sheets

(56) References Cited

U.S. PATENT DOCUMENTS

| 6,233,779 B1* | 5/2001 | Nelson, Sr. ........... | B60S 1/3801 |
| | | | 15/250.4 |
| 2005/0087084 A1* | 4/2005 | Gray ....................... | B41F 15/42 |
| | | | 101/123 |
| 2012/0174332 A1* | 7/2012 | Patterson ................. | A47L 1/06 |
| | | | 15/245 |

FOREIGN PATENT DOCUMENTS

| DE | 3527528 | * | 2/1987 |
| DE | 19961373 | * | 7/2001 |

* cited by examiner

WIPER ASSEMBLY, A WINDSHIELD WIPER APPARATUS AND A METHOD OF REUSING THE WIPER ASSEMBLY

TECHNICAL FIELD

The present disclosure relates to a wiper assembly, a windshield wiper apparatus and a method of reusing the wiper assembly.

BACKGROUND

Many vehicles, as well as non-automotive applications, have a windshield and windshield wipers. The windshield wipers can selectively wipe the windshield in certain situations. For example, if a liquid is disposed on the windshield, the windshield wipers can be activated to move relative to the windshield to move the liquid off of the windshield.

SUMMARY

The present disclosure provides a wiper assembly including a housing and a blade coupled to the housing. The blade includes a first edge portion disposed along a first side of the blade and a second edge portion disposed along a second side of the blade. The first edge portion and the second edge portion are reversible relative to the housing such that one of the first and second edge portions is disposed in a use position and the other one of the first and second edge portions is disposed in a storage position.

The present disclosure also provides a windshield wiper apparatus including a glass panel and a wiper assembly selectively movable relative to the glass panel. The wiper assembly includes the housing and the blade as discussed above. The first edge portion and the second edge portion are reversible relative to the housing such that one of the first and second edge portions is disposed in the use position to engage the glass panel and the other one of the first and second edge portions is disposed in the storage position spaced from the glass panel.

The present disclosure also provides a method of reusing a wiper assembly. The method includes decoupling a blade from a housing. The blade includes a first edge portion disposed along a first side of the blade and a second edge portion disposed along a second side of the blade. The method also includes reversing the first and second edge portions relative to the housing such that one of the first and second edge portions is disposed in a use position and the other one of the first and second edge portions is disposed in a storage position.

The detailed description and the drawings or Figures are supportive and descriptive of the disclosure, but the claim scope of the disclosure is defined solely by the claims. While some of the best modes and other embodiments for carrying out the claims have been described in detail, various alternative designs and embodiments exist for practicing the disclosure defined in the appended claims.

DETAILED DESCRIPTION

Those having ordinary skill in the art will recognize that all directional references (e.g., above, below, upward, up, downward, down, top, bottom, left, right, vertical, horizontal, etc.) are used descriptively for the figures to aid the reader's understanding, and do not represent limitations (for example, to the position, orientation, or use, etc.) on the scope of the disclosure, as defined by the appended claims. Furthermore, the term "substantially" can refer to a slight imprecision or slight variance of a condition, quantity, value, or dimension, etc., some of which that are within manufacturing variance or tolerance ranges.

Figure 1:
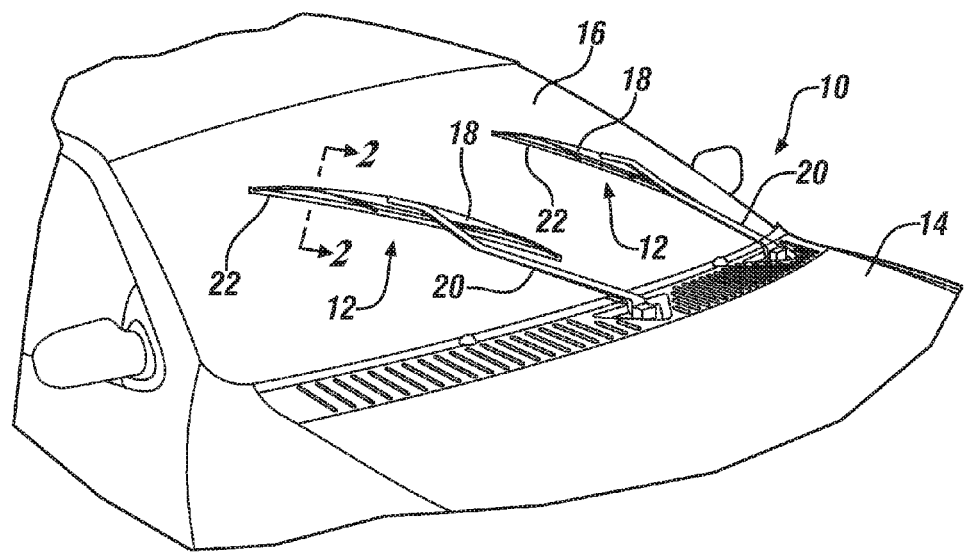
FIG. 1 is a schematic perspective view of a wiper assembly and a windshield wiper apparatus that can cooperate with a vehicle.

Referring to the Figures, wherein like numerals indicate like or corresponding parts throughout the several views, a windshield wiper apparatus 10 and a wiper assembly 12 are generally shown in FIG. 1. The windshield wiper apparatus 10 can include the wiper assembly 12. It is to be appreciated that a plurality of wiper assemblies 12 can be utilized, and the features of one wiper assembly 12 is discussed in detail below.

The windshield wiper apparatus 10 and the wiper assembly 12 can be utilized in many different applications. For example, the apparatus 10 and the assembly 12 can be utilized on a vehicle 14 or a non-vehicle. In certain embodiments, the vehicle 14 can be a car, a truck, a motorcycle, a boat, an aircraft, farm equipment, etc. In other embodiments, the non-vehicle can be a machine, farm equipment, a building, etc.

Figure 2:
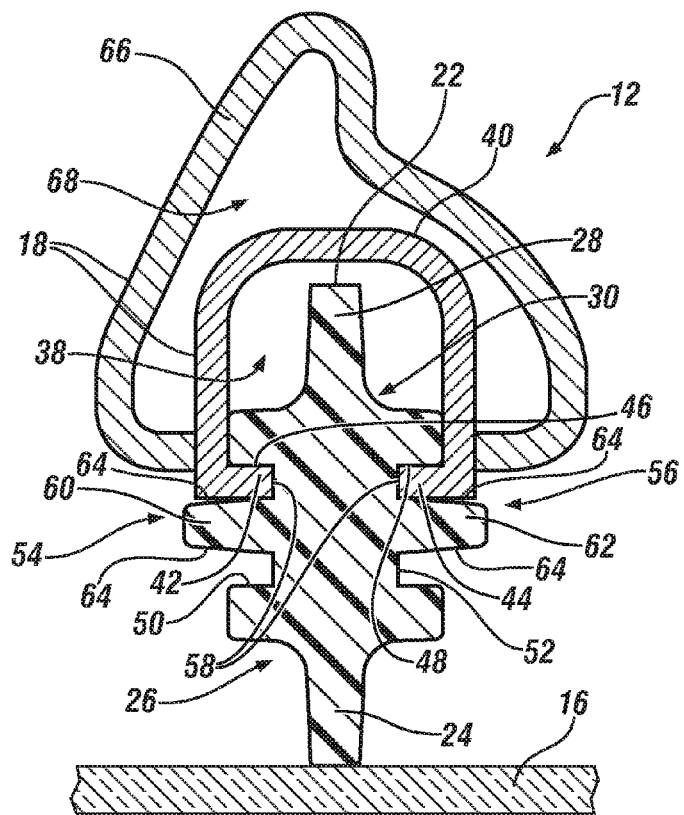
FIG. 2 is a schematic cross-sectional view of the wiper assembly taken from lines 2-2 in FIG. 1.

Referring to FIGS. 1 and 2, the windshield wiper apparatus 10 can include a glass panel 16. Generally, the glass panel 16 is configured of one or more materials that allow visibility through the glass panel 16. For example, the glass panel 16 can be a window, a windshield, etc. In one application, the glass panel 16 can be a windshield that cooperates with the vehicle 14 as shown in FIG. 1. It is to be appreciated that the glass panel 16 can be any suitable configuration and appearance. For example, the glass panel 16 can present a clear appearance, a shaded or tinted appearance, etc.

The wiper assembly 12 is selectively movable relative to the glass panel 16. For example, when the wiper assembly 12 is being utilized with the windshield, the wiper assembly 12 can be utilized to wipe the windshield to move debris, liquid, ice, snow, etc., from the windshield. The wiper assembly 12 can remain stationary when not in use and can be movable relative to the windshield when in use. Therefore, an actuator can selectively actuate to selectively move the wiper assembly 12.

Figure 3:
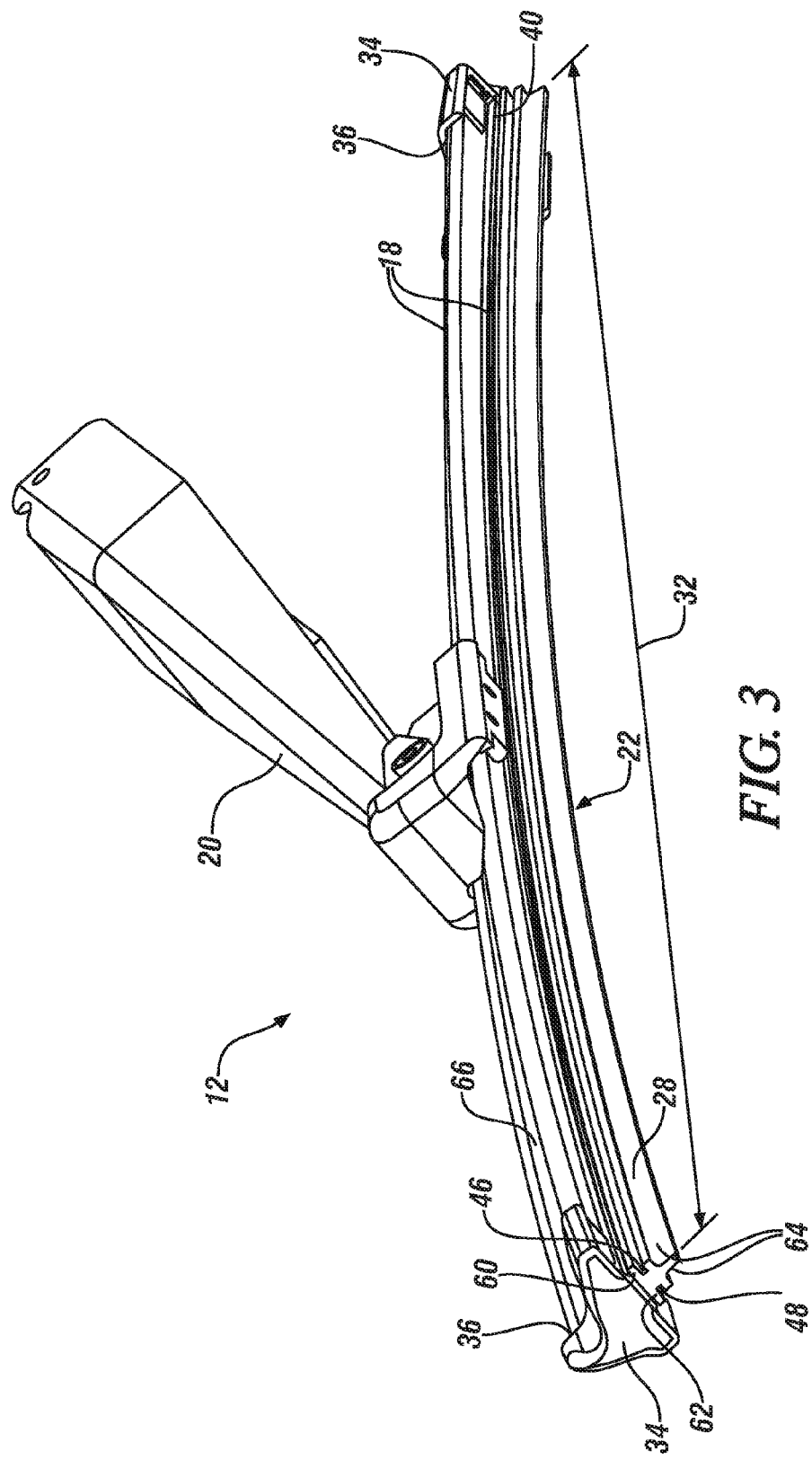
FIG. 3 is a schematic perspective view of the wiper assembly.

Referring to FIGS. 2 and 3, the wiper assembly 12 includes a housing 18. The housing 18 can be any suitable configuration. The housing 18 can be formed of one or more pieces, which is discussed further below. An arm 20 can be coupled to the housing 18, with the arm 20 movably attached to, for example, the vehicle 14. Therefore, when the actuator is actuated to move the wiper assembly 12, the arm 20 and the wiper assembly 12 move in unison relative to the glass panel 16 and/or the vehicle 14.

As best shown in FIG. 2, the housing 18 can include a holder 40 that couples the blade 22 to the housing 18. The housing 18 can include a plurality of pieces, or can be formed of one piece. For example, the housing 18 can include a body 66 that supports the holder 40. Therefore, the holder 40 can be a separate piece from the body 66. In this configuration, the body 66 and the holder 40 can be attached to each other to form a unit. As such, the housing 18 can include the body 66 and the holder 40 that is supported by the body 66. Optionally, the body 66 can define an aperture 68 that receives at least part of the holder 40.

Referring to FIGS. 2 and 3, the wiper assembly 12 also includes a blade 22 coupled to the housing 18. The blade 22 can be formed of any suitable material(s). For example, the blade 22 can be formed of rubber(s), polymer(s), combinations thereof, etc. The blade 22 can be extruded or formed by any suitable method.

Referring to FIG. 2, the blade 22 includes a first edge portion 24 disposed along a first side 26 of the blade 22 and a second edge portion 28 disposed along a second side 30 of the blade 22. Generally, one of the edge portions 24, 28 engages the glass panel 16 when in use, and the other one of the edge portions 24, 28 is stored until it is desirable to use one of the other edge portions 24, 28, which is discussed further below.

The first and second edge portions 24, 28 can be any suitable configuration. For example, the first and second edge portions 24, 28 can have sharp corners, angled corners or rounded corners, etc. As another example, the first and second edge portions 24, 28 can have flat side(s) or rounded side(s), etc. Furthermore, the first and second edge portions 24, 28 can have different configurations from each other. For example, the first edge portion 24 can have sharp corners while the second edge portion 28 can have rounded corners, or vice versa, and so on for the various different possible configurations.

The first edge portion 24 and the second edge portion 28 are reversible relative to the housing 18 such that one of the first and second edge portions 24, 28 is disposed in a use position and the other one of the first and second edge portions 24, 28 is disposed in a storage position. Referring to FIG. 2, for illustrative purposes only, the first edge portion 24 is disposed in the use position and the second edge portion 28 is disposed in the storage position. Referring to FIG. 3, for illustrative purposes only, the second edge portion 28 is disposed in the use position. Therefore, the first edge portion 24 and the second edge portion 28 are reversible relative to the housing 18 such that one of the first and second edge portions 24, 28 is disposed in the use position to engage the glass panel 16 and the other one of the first and second edge portions 24, 28 is disposed in the storage position spaced from the glass panel 16. The life of the single blade 22 can be extended by providing a plurality of edge portions 24, 28. Therefore, when one of the edge portions 24, 28 of the blade 22 is worn, the blade 22 can be rotated or turned to use one of the unused edge portions 24, 28, thus, extending the life of the single blade 22.

In certain embodiments, the first and second sides 26, 30 of the blade 22 can oppose each other. Therefore, the first and second edge portions 24, 28 can oppose each other. As such, reversible can include rotating or turning the blade 22 approximately 180 degrees. In various embodiments, the blade 22 can include more than two edge portions 24, 28. Furthermore, the first and second sides 26, 30 can be in other locations depending on the number of sides of the blade 22 and/or the number of edge portions 24, 28 being utilized. Therefore, reversible can include rotating or turning the blade 22 more or less than 180 degrees depending on the number of sides of the blade 22 that have edge portions 24, 28. Specifically, the blade 22 can include any suitable number of edge portions 24, 28.

As best shown in FIG. 3, generally, the blade 22 extends substantially along a length 32 of the housing 18. The housing 18 can include a plurality of end caps 34 couple to respective ends 36 of the housing 18. The blade 22 disposed between the end caps 34. Therefore, the end caps 34 can be coupled to the housing 18 to assist in maintaining the position of the blade 22 relative to the housing 18. When it is desirable to decouple the blade 22 from the housing 18 to turn the blade 22 to another one of the edge portions 24, 28, or replace the blade 22 when all of the edge portions 24, 28 are worn, one or more of the end caps 34 can be decoupled and the blade 22 is then decoupled from the housing 18. The end caps 34 can be coupled to the housing 18 by fastener(s), snap(s), clip(s), tab(s), connector(s) or any other suitable feature to couple and decouple the caps 34 with the housing 18.

Referring back to FIG. 2, the housing 18 can define a cavity 38 that receives one of the first and second edge portions 24, 28 when in the storage position. Therefore, the cavity 38 stores the edge portion 24, 28 that is not being utilized to selectively wipe the glass panel 16. Generally, the cavity 38 extends substantially the length 32 of the housing 18 from end 36 to end 36 of the housing 18. Therefore, when the blade 22 is to be decoupled from the housing 18, at least one of the end caps 34 is removed and the blade 22 is slide out of the cavity 38 at one of the ends 36 of the housing 18.

When the housing 18 includes a plurality of pieces, the holder 40 can define the cavity 38 that receives one of the first and second edge portions 24, 28 when in the storage position. Optionally, at least a portion of the cavity 38 and the aperture 68 of the body 66 can overlap each other.

Continuing with FIG. 2, in certain embodiments, the holder 40 can include a first coupling feature 42 and a second coupling feature 44 spaced from the first coupling feature 42. For example, the first coupling feature 42 of the holder 40 can include a first finger and the second coupling feature 44 of the holder 40 can include a second finger. Therefore, in certain embodiments, the holder 40 can include the first finger and the second finger. It is to be appreciated that the first and second coupling features 42, 44 of the holder 40 can include fastener(s), snap(s), clip(s), tab(s), connector(s) or any other suitable feature(s) to couple and decouple the blade 22 and the housing 18, and therefore, the first and second fingers are one non-limiting example. Furthermore, in certain embodiments, the first and second coupling features 42, 44 of the holder 40 can extend substantially the length 32 of the housing 18.

As best shown in FIG. 2, generally, the blade 22 can include a first coupling feature 46 configured to engage the housing 18 when the first edge portion 24 is in the use position and can include a second coupling feature 48 configured to engage the housing 18 when the first edge portion 24 is in the use position. More specifically, the first coupling feature 46 of the blade 22 can be configured to cooperate with the first coupling feature 42 of the holder 40 when the first edge portion 24 is in the use position. Furthermore, the second coupling feature 48 of the blade 22 can be configured to cooperate with the second coupling feature 44 of the holder 40 when the first edge portion 24 is in the use position. Therefore, when the first coupling features 42, 46 engage each other and the second coupling features 44, 48 engage each other, the blade 22 is coupled or secured to the housing 18. In certain embodiments, the first coupling feature 46 of the blade 22 can include a first groove and the second coupling feature 48 of the blade 22 can include a second groove. It is to be appreciated that the first and second coupling features 46, 48 of the blade 22 can include fastener(s), snap(s), clip(s), tab(s), connector(s) or any other suitable feature(s) to couple and decouple the blade 22 and the housing 18, and therefore, the first and second grooves are one non-limiting example.

Continuing with FIG. 2, generally, the blade 22 can also include a third coupling feature 50 configured to engage the housing 18 when the second edge portion 28 is in the use position and can include a fourth coupling feature 52 configured to engage the housing 18 when the second edge portion 28 is in the use position. More specifically, the third coupling feature 50 of the blade 22 can be configured to cooperate with the second coupling feature 44 of the holder 40 when the second edge portion 28 is in the use position. Furthermore, the fourth coupling feature 52 of the blade 22 can be configured to cooperate with the first coupling feature 42 of the holder 40 when the second edge portion 28 is in the use position. In certain embodiments, the third coupling feature 50 of the blade 22 can include a third groove and the fourth coupling feature 52 of the blade 22 can include a fourth groove. Therefore, the blade 22 can define the first groove, the second groove, the third groove and the fourth groove, and in certain embodiments these grooves are spaced from each other. It is to be appreciated that the third and fourth coupling features 50, 52 of the blade 22 can include fastener(s), snap(s), clip(s), tab(s), connector(s) or any other suitable feature(s) to couple and decouple the blade 22 and the housing 18, and therefore, the third and fourth grooves are one non-limiting example.

As alternative examples of the configurations of the first and second coupling features 42, 44, the first and second coupling features 42, 44 of the holder 40 can be configured similarly to the first and second grooves instead of the fingers, or one of the first and second coupling features 42, 44 of the holder 40 can be configured similarly to one of the first and second grooves and the other one of the first and second coupling features 42, 44 of the holder 40 can be configured as one of the first and second fingers. Correspondingly, if the configuration of one or both of the first and second coupling features 42, 44 of the holder 40 are configured as the grooves, then the first, second, third and fourth coupling features 46, 48, 50, 52 of the blade 22 are changed accordingly. Therefore, any of the first, second, third and fourth grooves of the blade 22 can be configured similarly to the first and second fingers, instead of grooves.

Referring to FIG. 2, the blade 22 can include a third side 54 having the first and third coupling features 46, 50 of the blade 22. The blade 22 can also include a fourth side 56 having the second and fourth coupling features 48, 52 of the blade 22. In certain embodiments, the third and fourth sides 54, 56 of the blade 22 can oppose each other. Therefore, generally, the first and third coupling features 46, 50 of the blade 22 can oppose the second and fourth coupling features 48, 52 of the blade 22, respectively. It is to be appreciated that the first, second, third and fourth coupling features 46, 48, 50, 52 of the blade 22 can be disposed in any suitable location along the respective third and fourth sides 54, 56.

As discussed above, in certain embodiments, the first and second sides 26, 30 of the blade 22 can oppose each other. The first and second sides 26, 30 can face away from each other and be spaced from each other, and similarly, the third and fourth sides 54, 56 can face away from each other and be spaced from each other. As discussed above, depending on the number of sides 26, 30, 54, 56 of the blade 22 and/or the number of edge portions 24, 28, the sides 26, 30, 54, 56 can be in different locations than illustrated. Furthermore, the configuration of the blade 22 where the sides 26, 30, 54, 56 meet can be any suitable configuration. For example, respective sides 26, 30, 54, 56 can meet at a sharp corner, angled corner or rounded corner, etc.

Generally, the first finger of the holder 40 is disposed in the first groove when the first edge portion 24 is in the use position and the second finger of the holder 40 is disposed in the second groove when the first edge portion 24 is in the use position. Furthermore, the first finger of the holder 40 is disposed in the fourth groove when the second edge portion 28 is in the use position and the second finger of the holder 40 is disposed in the third groove when the second edge portion 28 is in the use position. Therefore, when reversing the blade 22, the blade 22 is decoupled from the housing 18 and turned to protrude the other edge portion 24, 28 outside of the housing 18 and the location of engagement between the holder 40 and the blade 22 can change.

Referring to FIG. 2, the first and second fingers can face each other and can be spaced from each other to define an opening 58 therebetween. The blade 22 can be disposed through the opening 58 such that the first edge portion 24 protrudes outside of the housing 18 when the first edge portion 24 is in the use position and the second edge portion 28 is disposed in the cavity 38 in the storage position when the first edge portion 24 is in the use position. Therefore, part of the blade 22 is disposed in the opening 58 such that one of the edge portions 24, 28 is spaced from the opening 58 along one side of the opening 58 and another one of the edge portions 24, 28 is spaced from the opening 58 along another side of the opening 58. Depending on which of the edge portions 24, 28 is being used, the other edge portion(s) 24, 28 are stored for future use.

Referring to FIG. 2, the first and third grooves can be separated by a first projection 60 and the second and fourth grooves can be separated by a second projection 62. Therefore, generally, the first and third coupling features 46, 50 of the blade 22 are separated by the first projection 60, and the second and fourth coupling features 48, 52 of the blade 22 are separated by the second projection 62. In certain embodiments, the first and second projections 60, 62 can extend outwardly away from each other. The first and third grooves can be spaced from each other and substantially parallel to each other, and similarly, the second and fourth grooves can be spaced from each other and substantially parallel to each other. The first and second projections 60, 62 can each include a pair of outer surfaces 64. Optionally, the outer surfaces 64 of each of the projections 60, 62 can be tapered or angled relative to the third and fourth sides 54, 56 respectively. Alternatively, the outer surfaces 64 of the first projection 60 can be substantially flat or parallel relative to each other, and similarly, the outer surfaces 64 of the second projection 62 can be substantially flat or parallel relative to each other. It is to be appreciated that the outer surfaces 64 of the projections 60, 62 can be any suitable configuration.

The present disclosure also provides a method of reusing the wiper assembly 12. The wiper assembly 12 discussed herein provides a plurality of uses before being replaced with another wiper assembly 12 or before replacing the blade 22. Therefore, the wiper assembly 12 provides a plurality of edge portions 24, 28 that can be utilized to wipe the glass panel 16. As suggested above, the edge portions 24, 28 are utilized one at a time. As such, when one of the edge portions 24, 28 is worn, the blade 22 can be rotated or turned to another side 26, 30 that has a new edge portion 24, 28. The blade 22 can be turned as many times as there are unused edge portions 24, 28.

The method includes decoupling the blade 22 from the housing 18. The blade 22 can include the features discussed above, such as, the first edge portion 24 disposed along the first side 26 of the blade 22 and the second edge portion 28 disposed along the second side 30 of the blade 22, etc. One or both of the end caps 34 can be decoupled or detached from the housing 18, and then the blade 22 can be pulled or pushed relative to the housing 18 to remove the blade 22 from the cavity 38 and the opening 58 of the housing 18. In other words, the blade 22 can be slid relative to the housing 18 out of the cavity 38 through one of the ends 36 of the housing 18.

The method also includes reversing the first and second edge portions 24, 28 relative to the housing 18 such that one of the first and second edge portions 24, 28 is disposed in the use position and the other one of the first and second edge portions 24, 28 is disposed in the storage position. The blade 22 can be reversed once the blade 22 is decoupled from the housing 18.

The method can also include sliding the blade 22 along the length 32 of the housing 18 to recouple the blade 22 to the housing 18 after reversing the first and second edge portions 24, 28 relative to the housing 18. Therefore, for example, if the first edge portion 24 was originally in the use position, now after reversing the blade 22, the first edge portion 24 is in the storage position. The blade 22 is reinserted or slid into the cavity 38 and the opening 58 of the housing 18, and once the blade 22 is repositioned relative to the housing 18, the end cap(s) 34 can then be recoupled to the housing 18.

While the best modes and other embodiments for carrying out the disclosure have been described in detail, those familiar with the art to which this disclosure relates will recognize various alternative designs and embodiments for practicing the disclosure within the scope of the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A wiper assembly comprising:
a housing;
a blade coupled to the housing and including a first edge portion disposed along a first side of the blade and a second edge portion disposed along a second side of the blade; and
wherein the first edge portion and the second edge portion are reversible relative to the housing such that one of the first and second edge portions is disposed in a use position and the other one of the first and second edge portions is disposed in a storage position;
wherein the housing includes a first coupling feature and a second coupling feature spaced from the first coupling feature;
wherein the blade includes a first coupling feature configured to cooperate with the first coupling feature of the housing when the first edge portion is in the use position and a second coupling feature configured to cooperate with the second coupling feature of the housing when the first edge portion is in the use position;
wherein the blade includes a third coupling feature configured to cooperate with the second coupling feature of the housing when the second edge portion is in the use position and a fourth coupling feature configured to cooperate with the first coupling feature of the housing when the second edge portion is in the use position;
wherein the first and third coupling features of the blade are separated by a first projection and the second and fourth coupling features of the blade are separated by a second projection;
wherein the housing defines a cavity that receives one of the first and second edge portions when in the storage position;
wherein the housing includes a holder that couples the blade to the housing;
wherein the holder includes the first coupling feature and the second coupling feature;
wherein the first coupling feature of the holder includes a first finger and the second coupling feature of the holder includes a second finger;
wherein the first coupling feature of the blade includes a first groove and the second coupling feature of the blade includes a second groove;
wherein the first finger of the holder is disposed in the first groove when the first edge portion is in the use position and the second finger of the holder is disposed in the second groove when the first edge portion is in the use position.

2. The assembly as set forth in claim 1 wherein:
the first and second fingers face each other and are spaced from each other to define an opening therebetween; and
the blade is disposed through the opening such that the first edge portion protrudes outside of the housing when the first edge portion is in the use position and the second edge portion is disposed in the cavity in the storage position when the first edge portion is in the use position.

3. The assembly as set forth in claim 1 wherein:
the third coupling feature of the blade includes a third groove and the fourth coupling feature of the blade includes a fourth groove; and
the first finger of the holder is disposed in the fourth groove when the second edge portion is in the use position and the second finger of the holder is disposed in the third groove when the second edge portion is in the use position.

4. The assembly as set forth in claim 3 wherein the first and second projections extend outwardly away from each other.

5. The assembly as set forth in claim 1 wherein the housing includes a body that supports the holder, and the holder defines the cavity that receives one of the first and second edge portions when in the storage position.

6. The assembly as set forth in claim 1 wherein first and second sides of the blade oppose each other.

7. The assembly as set forth in claim 6 wherein the blade includes a third side having the first and third coupling features of the blade and includes a fourth side having the second and fourth coupling features of the blade.

8. The assembly as set forth in claim 7 wherein the third and fourth sides oppose each other.

9. The assembly as set forth in claim 1 wherein the housing includes a plurality of end caps coupled to respective ends of the housing to maintain the blade between the end caps.

10. A windshield wiper apparatus, the apparatus comprising:
a glass panel;
a wiper assembly selectively movable relative to the glass panel, the assembly including;
a housing;

a blade coupled to the housing and including a first edge portion disposed along a first side of the blade and a second edge portion disposed along a second side of the blade; and wherein the first edge portion and the second edge portion are reversible relative to the housing such that one of the first and second edge portions is disposed in a use position to engage the glass panel and the other one of the first and second edge portions is disposed in a storage position spaced from the glass panel;

wherein the blade includes a first coupling feature, a second coupling feature, a third coupling feature and a fourth coupling feature; and wherein the first and third coupling features of the blade are separated by a first projection and the second and fourth coupling features of the blade are separated by a second projection;

wherein the housing includes a body and a holder that is supported by the body, and the holder defines a cavity that receives one of the first and second edge portions when in the storage position;

wherein the holder includes a first finger and a second finger;

wherein the first coupling feature of the blade includes a first groove, the second coupling feature of the blade includes a second groove, the third coupling feature of the blade includes a third groove and the fourth coupling feature of the blade includes a fourth groove that are spaced from each other;

wherein the first finger of the holder is disposed in the first groove when the first edge portion is in the use position and the second finger of the holder is disposed in the second groove when the first edge portion is in the use position;

wherein the first finger of the holder is disposed in the fourth groove when the second edge portion is in the use position and the second finger of the holder is disposed in the third groove when the second edge portion is in the use position.

11. The apparatus as set forth in claim 10 wherein:
the first and second fingers face each other and are spaced from each other to define an opening therebetween; and
the blade is disposed through the opening such that the first edge portion protrudes outside of the housing when the first edge portion is in the use position and the second edge portion is disposed in the cavity in the storage position when the first edge portion is in the use position.

12. The apparatus as set forth in claim 10 wherein the housing includes a plurality of end caps coupled to respective ends of the housing to maintain the blade between the end caps.

* * * * *